(12) United States Patent
Baeckler et al.

(10) Patent No.: US 12,086,518 B2
(45) Date of Patent: Sep. 10, 2024

(54) PROGRAMMABLE INTEGRATED CIRCUIT UNDERLAY

(71) Applicant: Intel Corporation, Santa Clara, CA (US)

(72) Inventors: Gregg William Baeckler, San Jose, CA (US); Martin Langhammer, Alderbury (GB)

(73) Assignee: Intel Corporation, Santa Clara, CA (US)

( * ) Notice: Subject to any disclaimer, the term of this patent is extended or adjusted under 35 U.S.C. 154(b) by 897 days.

(21) Appl. No.: 16/889,449

(22) Filed: Jun. 1, 2020

(65) Prior Publication Data
US 2020/0293707 A1    Sep. 17, 2020

(51) Int. Cl.
| | |
|---|---|
| *G06F 30/327* | (2020.01) |
| *G06F 30/337* | (2020.01) |
| *G06F 30/34* | (2020.01) |
| *G06F 30/373* | (2020.01) |
| *G06F 30/394* | (2020.01) |
| *G06F 30/398* | (2020.01) |
| *H01L 23/48* | (2006.01) |
| *H01L 23/52* | (2006.01) |

(Continued)

(52) U.S. Cl.
CPC ............ *G06F 30/327* (2020.01); *G06F 30/34* (2020.01); *G06F 30/337* (2020.01); *G06F 30/373* (2020.01); *G06F 30/394* (2020.01); *G06F 30/398* (2020.01); *G06F 2111/16* (2020.01); *H01L 23/48* (2013.01); *H01L 23/52* (2013.01); *H01L 23/58* (2013.01); *H01L 25/03* (2013.01)

(58) Field of Classification Search
CPC ...... G06F 30/327; G06F 30/34; G06F 30/373; G06F 30/398; G06F 30/394; G06F 30/395; G06F 30/337; G06F 2111/16; H01L 23/48; H01L 23/52; H01L 23/58; H01L 25/03
USPC ........ 716/104, 105, 106, 111, 116, 121, 128, 716/132, 136; 703/15; 326/41, 47, 101
See application file for complete search history.

(56) References Cited

U.S. PATENT DOCUMENTS

| | | | |
|---|---|---|---|
| 5,877,942 A | * | 3/1999 | Kida ...................... H05K 1/112 361/728 |
| 6,086,629 A | | 7/2000 | McGettigan et al. |

(Continued)

FOREIGN PATENT DOCUMENTS

| | | | | |
|---|---|---|---|---|
| EP | 3343413 A2 | | 4/2018 | |
| WO | WO-2004013967 A2 | * | 2/2004 | ......... G06F 17/5054 |
| WO | WO-2008057071 A2 | * | 5/2008 | ......... G06F 17/5031 |

OTHER PUBLICATIONS

Extended European Search Report for EP 20208030.5 dated May 3, 2021.

*Primary Examiner* — Phallaka Kik
(74) *Attorney, Agent, or Firm* — Fletcher Yoder, P.C.

(57) ABSTRACT

A method for implementing a programmable device is provided. The method may include extracting an underlay from an existing routing network on the programmable device and then mapping a user design to the extracted underlay. The underlay may represent a subset of fast routing wires satisfying predetermined constraints. The underlay may be composed of multiple repeating adjacent logic blocks, each implementing some datapath reduction operation. Implementing circuit designs in this way can dramatically improve circuit performance while cutting down compile times by more than half.

21 Claims, 14 Drawing Sheets

(51) Int. Cl.
*H01L 23/58* (2006.01)
*H01L 25/03* (2006.01)
*G06F 111/16* (2020.01)

(56) References Cited

U.S. PATENT DOCUMENTS

| | | | |
|---|---|---|---|
| 6,167,558 A * | 12/2000 | Trimberger | G01R 31/318519 716/128 |
| 6,631,510 B1 * | 10/2003 | Betz | G06F 30/34 716/121 |
| 7,051,313 B1 | 5/2006 | Betz et al. | |
| 7,246,340 B1 * | 7/2007 | Van Antwerpen | G06F 30/327 716/135 |
| 7,409,669 B1 * | 8/2008 | Dastidar | G01R 31/318516 716/128 |
| 7,451,420 B1 | 11/2008 | Reynolds et al. | |
| 8,001,511 B1 * | 8/2011 | Bauer | H03K 19/177 716/112 |
| 8,104,009 B1 * | 1/2012 | Kang | G06F 30/394 716/110 |
| 8,468,192 B1 * | 6/2013 | Langhammer | G06F 7/5324 708/620 |
| 8,468,487 B1 | 6/2013 | Parpia et al. | |
| 8,812,289 B1 * | 8/2014 | Chan | G06F 30/331 703/28 |
| 8,856,702 B1 | 10/2014 | Singh et al. | |
| 8,861,517 B2 | 10/2014 | Baker et al. | |
| 10,242,144 B1 | 3/2019 | Adya et al. | |
| 10,402,521 B1 * | 9/2019 | Reynolds | G06F 30/392 |
| 10,817,463 B1 * | 10/2020 | DeBenedictis | G06N 10/00 |
| 10,853,548 B1 * | 12/2020 | Goodsitt | G06F 30/347 |
| 11,928,059 B2 * | 3/2024 | Natu | G06F 12/0811 |
| 2004/0268288 A1 * | 12/2004 | Bajuk | G06F 30/30 716/103 |
| 2006/0158217 A1 | 7/2006 | Madurawe | |
| 2006/0164119 A1 * | 7/2006 | Nowak-Leijten | H03K 19/17728 326/41 |
| 2008/0229081 A1 * | 9/2008 | Yamanaka | G06F 15/7867 712/E9.017 |
| 2009/0249276 A1 * | 10/2009 | Wu | G06F 30/34 716/128 |
| 2010/0241900 A1 * | 9/2010 | Check | G06F 11/1048 714/724 |
| 2014/0189622 A1 | 7/2014 | Titley et al. | |
| 2015/0020038 A1 | 1/2015 | Feng et al. | |
| 2017/0109466 A1 | 4/2017 | Guerin et al. | |
| 2019/0095566 A1 | 3/2019 | Denisenko | |
| 2019/0103873 A1 * | 4/2019 | Sechen | H03K 19/17744 |
| 2019/0377846 A1 * | 12/2019 | Hanchinal | G06F 13/4027 |
| 2020/0142842 A1 * | 5/2020 | Ryu | G06F 13/1668 |
| 2021/0312114 A1 * | 10/2021 | Lin | G11C 11/412 |

* cited by examiner

PROGRAMMABLE INTEGRATED CIRCUIT UNDERLAY

BACKGROUND

This relates generally to integrated circuits and, in particular, to ways for improving the design and speed of programmable integrated circuits.

Programmable integrated circuits such as programmable logic devices (PLDs) include configurable logic circuitry having look-up tables (LUTs) and adder based logic that are designed to allow a user to customize the circuitry to the user's particular needs. PLDs also include arithmetic logic such as adders, multipliers, and dot-product circuits.

Programmable integrated circuits typically have a maximum speed capability. For example, a programmable logic device is provided with a substantial amount of pipelining resources that allow the device to have a maximum operating speed of 1 GHz. In practice, however, typical user designs only run at 300-400 MHz, so the device is substantially underutilized from a performance standpoint.

It is within this context that the embodiments described herein arise.

DETAILED DESCRIPTION

The present embodiments relate to methods for extracting or parsing fast routing patterns from a programmable integrated circuit interconnect architecture and mapping a user application to the extracted fast routing patterns. The extracted routing patterns (sometimes referred to as a routing "underlay") can be different depending on the target logic utilization and speed. The routing patterns may be repeated across the programmable integrated circuit.

Designing a custom logic circuit using underlays in this way can dramatically increase the speed of the user application while cutting down compile times by 50% or more. For example, in a scenario in which a programmable logic device has a maximum operating speed of 1 GHz, a user application designed in this way can run up to 800-900 MHz, which is more than two times faster than prior designs. It will be recognized by one skilled in the art, that the present exemplary embodiments may be practiced without some or all of these specific details. In other instances, well-known operations have not been described in detail in order not to unnecessarily obscure the present embodiments.

Figure 1:
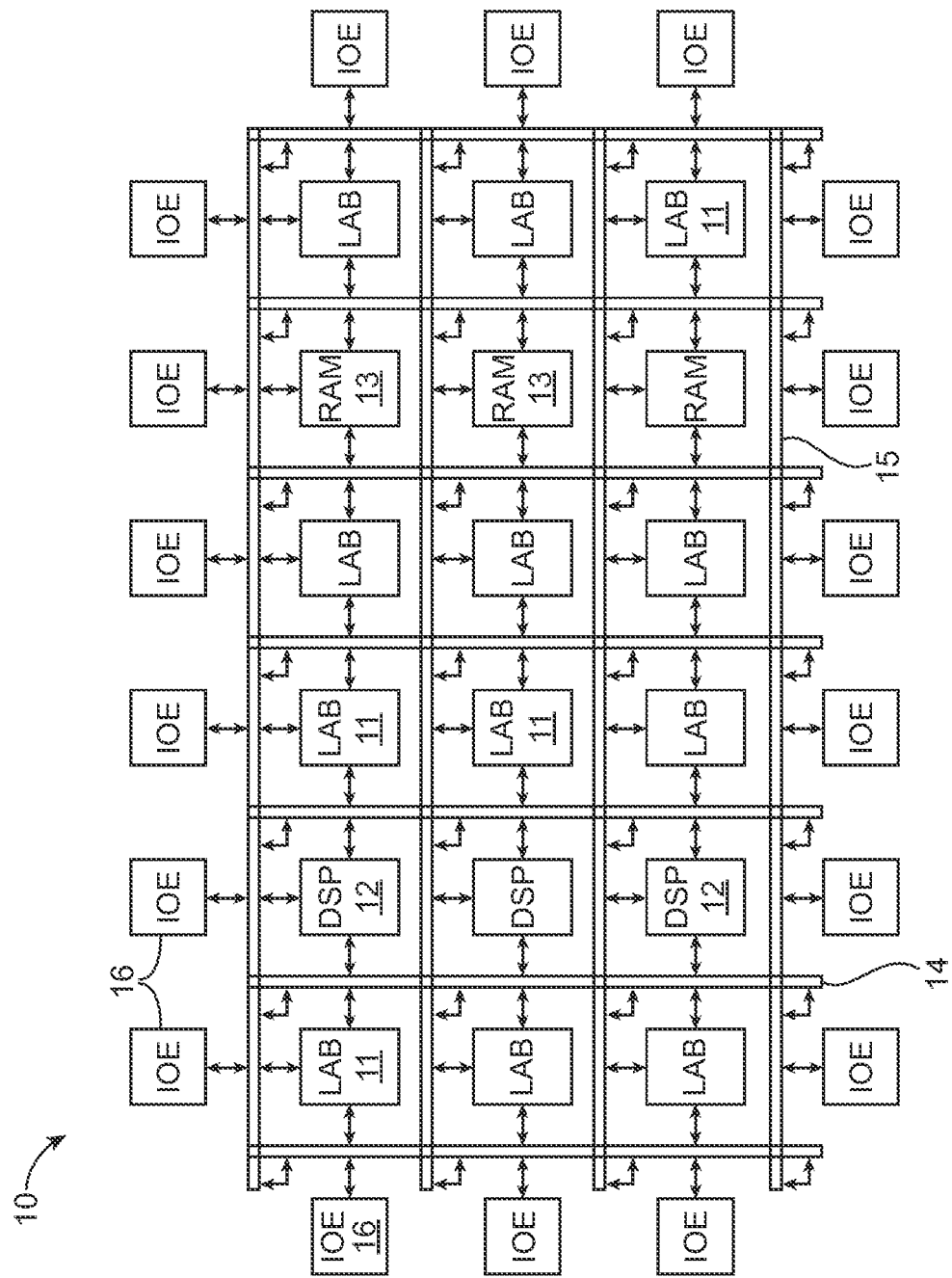
FIG. 1 is a diagram of an illustrative programmable integrated circuit in accordance with an embodiment.

With the foregoing in mind, FIG. 1 is a diagram of a programmable integrated circuit 10. As shown in FIG. 1, programmable logic device 10 may include a two-dimensional array of functional blocks, including logic array blocks (LABs) 11 and other functional blocks, such as random access memory (RAM) blocks 13 and specialized processing blocks such as digital signal processing (DSP) blocks 12 that are part or fully hardwired to perform one or more specific tasks such as mathematical/arithmetic operations.

Functional blocks such as LABs 11 may include smaller programmable regions (e.g., logic elements, configurable logic blocks, or adaptive logic modules) that receive input signals and perform custom functions on the input signals to produce output signals. Device 10 may further include programmable routing fabric that used to interconnect LABs 11 with RAM blocks 13 and DSP blocks 12. The combination of the programmable logic and routing fabric is sometimes referred to as "soft" logic, whereas the DSP blocks are sometimes referred to as "hard" logic. The type of hard logic on device 10 is not limited to DSP blocks and may include other types of hard logic. Adders/subtractors, multipliers, dot product computation circuits, and other arithmetic circuits which may or may not be formed as part of a DSP block 12 may sometimes be referred to collectively as "arithmetic logic."

Programmable logic device 10 may contain programmable memory elements for configuring the soft logic. Memory elements may be loaded with configuration data (also called programming data) using input/output elements (IOEs) 16. Once loaded, the memory elements provide corresponding static control signals that control the operation of one or more LABs 11, programmable routing fabric, and optionally DSPs 12 or RAMs 13. In a typical scenario, the outputs of the loaded memory elements are applied to the gates of metal-oxide-semiconductor transistors (e.g., pass transistors) to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc. The logic gates and multiplexers that are part of the soft logic, configurable state machines, or any general logic component not having a single dedicated purpose on device 10 may be referred to collectively as "random logic."

The memory elements may use any suitable volatile and/or non-volatile memory structures such as random-access-memory (RAM) cells, fuses, antifuses, programmable read-only-memory memory cells, mask-programmed and laser-programmed structures, mechanical memory devices (e.g., including localized mechanical resonators), mechanically operated RAM (MORAM), programmable metallization cells (PMCs), conductive-bridging RAM (CBRAM), resistive memory elements, combinations of these structures, etc. Because the memory elements are loaded with configuration data during programming, the memory elements are sometimes referred to as configuration memory, configuration RAM (CRAM), configuration memory elements, or programmable memory elements.

In addition, programmable logic device 10 may use input/output elements (IOEs) 16 to drive signals off of device 10 and to receive signals from other devices. Input/output elements 16 may include parallel input/output circuitry, serial data transceiver circuitry, differential receiver and transmitter circuitry, or other circuitry used to connect one integrated circuit to another integrated circuit. As shown, input/output elements 16 may be located around the periphery of the chip. If desired, the programmable logic device may have input/output elements 16 arranged in different ways.

The routing fabric (sometimes referred to as programmable interconnect circuitry) on PLD 10 may be provided in the form of vertical routing channels 14 (i.e., interconnects formed along a vertical axis of PLD 10) and horizontal routing channels 15 (i.e., interconnects formed along a horizontal axis of PLD 10), each routing channel including at least one track to route at least one wire. If desired, routing wires may be shorter than the entire length of the routing channel. A length L wire may span L functional blocks. For example, a length four wire may span four functional blocks. Length four wires in a horizontal routing channel may be referred to as "H4" wires, whereas length four wires in a vertical routing channel may be referred to as "V4" wires.

Furthermore, it should be understood that embodiments may be implemented in any integrated circuit. If desired, the functional blocks of such an integrated circuit may be arranged in more levels or layers in which multiple functional blocks are interconnected to form still larger blocks. Other device arrangements may use functional blocks that are not arranged in rows and columns. Device 10 arranged in this way is sometimes referred to as a field-programmable gate array (FPGA).

Figure 2:
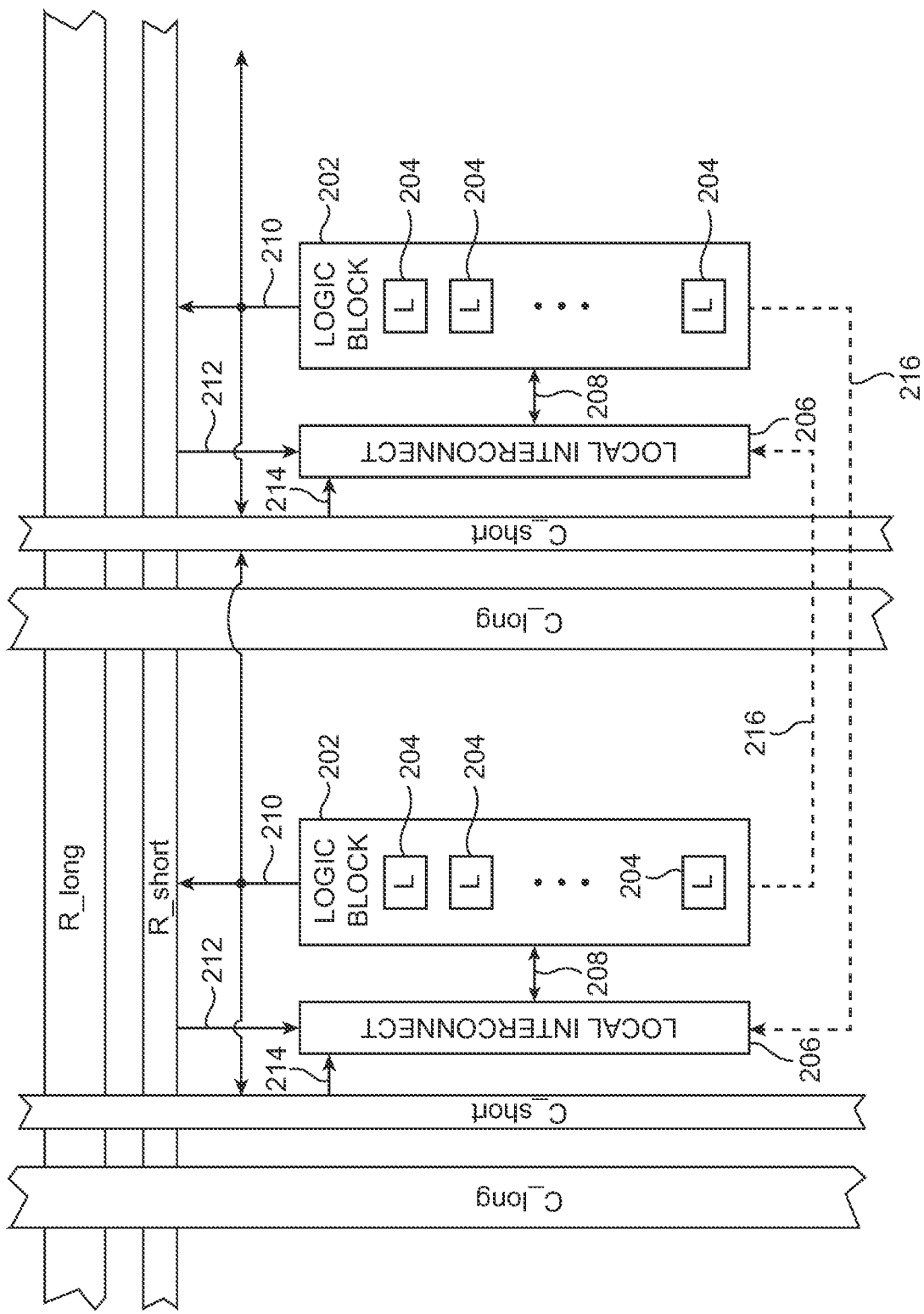
FIG. 2 is a diagram of programmable logic blocks coupled together using interconnect circuitry in accordance with an embodiment.

FIG. 2 is a diagram of programmable logic blocks coupled together using interconnect circuitry. As shown in FIG. 2, two logic blocks such as logic blocks 202 may be interconnected using routing horizontal (row-wise) routing channels R_long and R_short and using vertical (column-wise) routing channels C_long and C_short. Logic blocks 202 may represent LABs 11 of FIG. 1 or may represent other suitable groupings of logic components. In the example of FIG. 2, each logic block 202 may include smaller regions of programmable logic 204. The smaller programmable logic regions 204 within each logic block 202 are sometimes referred to as adaptive logic modules (ALMs), logic elements, or logic cells. There may be any suitable number of logic cells 204 within logic block 202. In general, each logic cell or ALM 202 may be a native element on the FPGA that includes a group of lookup table (LUT) circuits and associated registers, which can be collectively configured to implement logic gates or even arithmetic circuits.

The row-wise routing channels R_long and R_short may represent the horizontal routing channels 15 shown in FIG. 1. The longer routing channels R_long may span more logic blocks (e.g., spanning more than 10 logic blocks, more than 20 logic blocks, more than 30 logic blocks, etc.), whereas the shorter routing channels R_short may span relatively fewer logic blocks (e.g., spanning less than 10 logic blocks, less than five logic blocks, etc.).

Similarly, the column-wise routing channels C_long and C_short may represent the vertical routing channels 14 shown in FIG. 1. The longer routing channels C_long may span more logic blocks (e.g., spanning more than 10 logic blocks, more than 20 logic blocks, more than 30 logic blocks, etc.), whereas the shorter routing channels C_short may span relatively fewer logic blocks (e.g., spanning less than 10 logic blocks, less than five logic blocks, etc.).

The long routing channels R_long and C_long are therefore sometimes referred to as long global interconnects, whereas the short routing channels R_short and C_short are sometimes referred to as short global interconnects. Each logic block 202 may be coupled to the short global interconnects via routing wires 210. Logic block 202 may access the long global interconnects via the short global interconnects.

Each logic block 202 may further be coupled to an associated local interconnect circuit 206 via path 208. Signals on R_short may be coupled to local interconnect circuit 206 via path 212, whereas signals on C_short may be coupled to local interconnect circuit 206 via path 214. Logic block 202 may further be directly coupled to a neighboring local interconnect circuit 206 (i.e., the local interconnect circuit 206 associated with a neighboring logic block 202) via direct-link path 216. This direct-link path 216 may represent the fastest routing path between adjacent logic blocks and may sometimes be referred to as a "sneak" path.

It can be a significant undertaking to design and implement a custom logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

Figure 3:
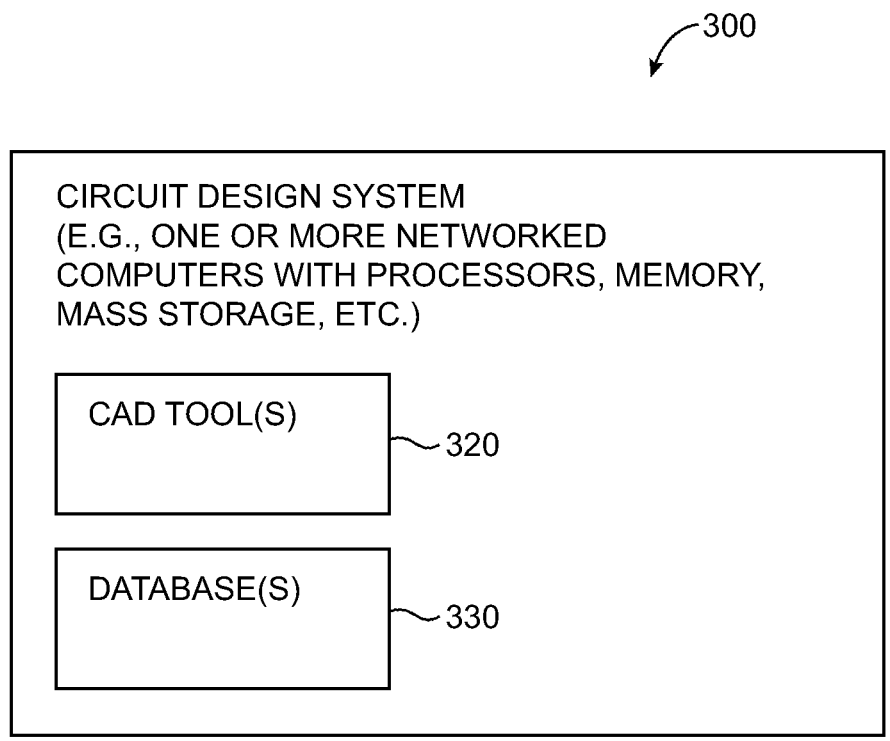
FIG. 3 is a diagram of an illustrative circuit design system that may be used to design integrated circuits in accordance with an embodiment.

An illustrative logic circuit design system 300 in accordance with an embodiment is shown in FIG. 3. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods (processes). When performing these processes, the computing equipment is configured to implement the functions of circuit design system 300.

The computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
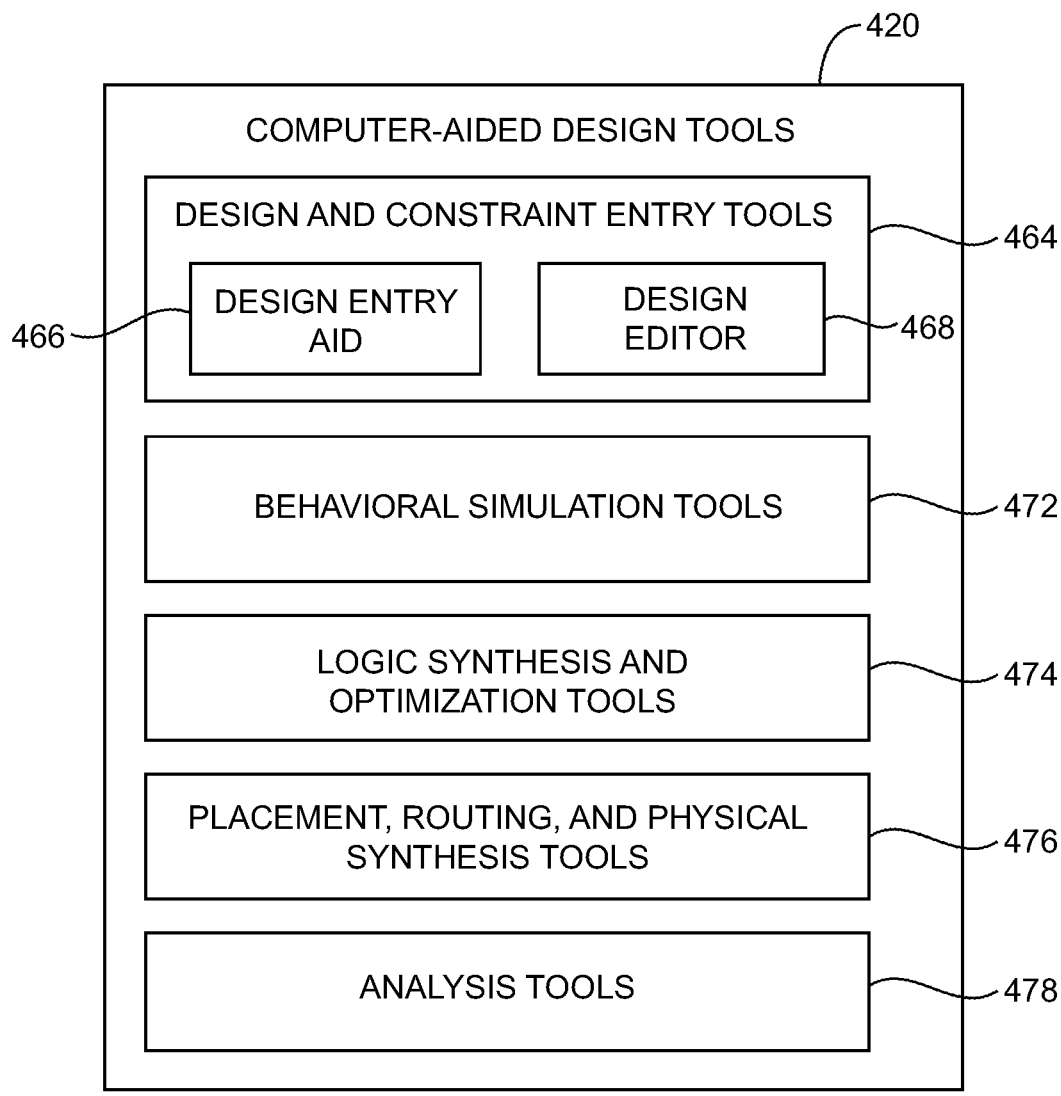
FIG. 4 is a diagram of illustrative computer-aided design (CAD) tools that may be used in a circuit design system in accordance with an embodiment.

Illustrative computer aided design tools 420 that may be used in a circuit design system such as circuit design system 300 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should have certain features. Design editor 468 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 472 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as a field-programmable gate array (FPGA)).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description of the integrated circuit or configuration data for programming the programmable logic device.

Figure 5:
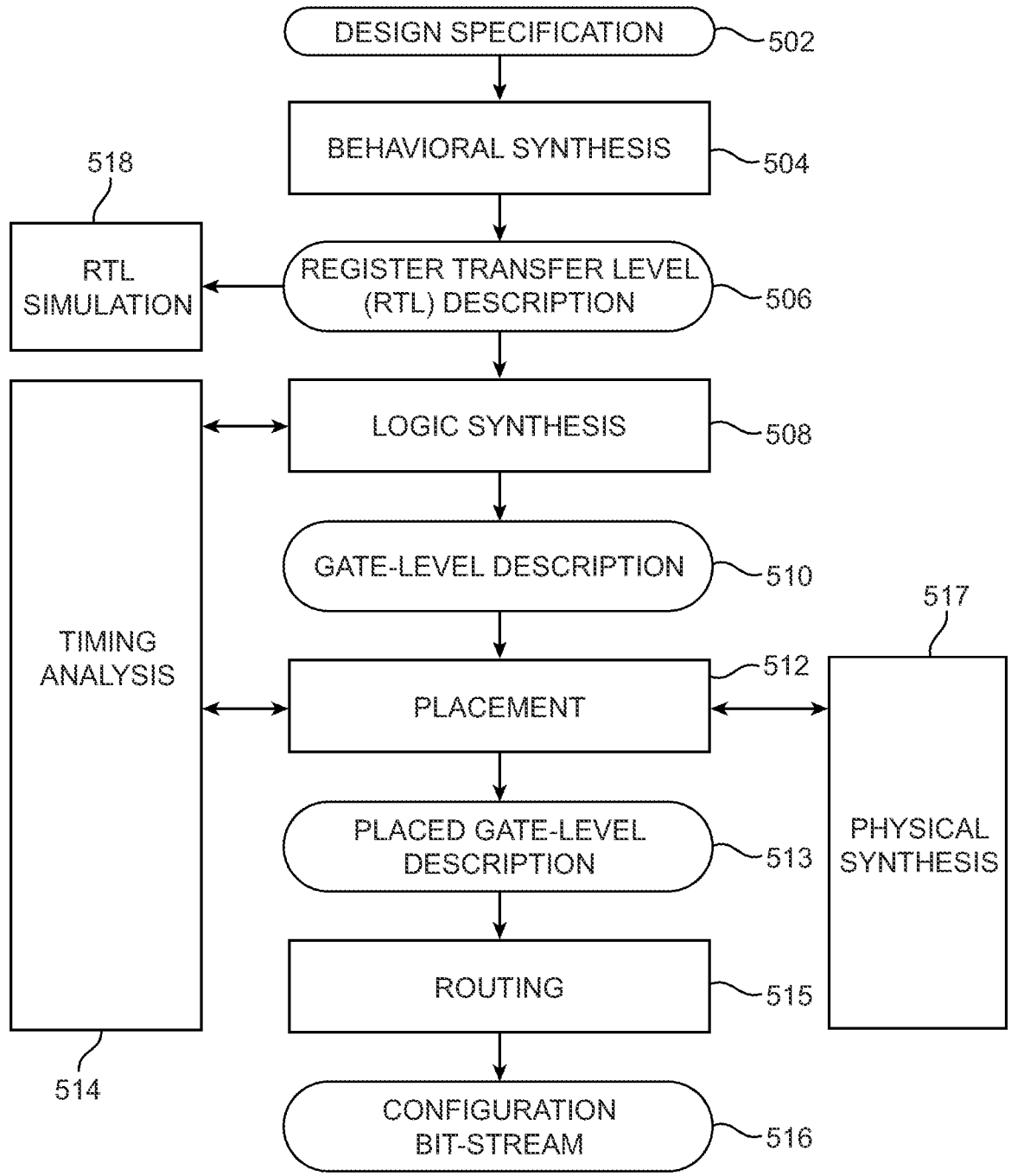
FIG. 5 is a flow chart of illustrative steps for designing an integrated circuit in accordance with an embodiment.

Illustrative operations involved in using tools 420 of FIG. 4 to produce the mask-level layout description of the integrated circuit are shown in FIG. 5. As shown in FIG. 5, a circuit designer may first provide a design specification 502. The design specification 502 may, in general, be a behavioral description provided in the form of an application code (e.g., C code, C++ code, SystemC code, OpenCL code, etc.). In some scenarios, the design specification may be provided in the form of a register transfer level (RTL) description 506.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation or in the form of a code using OpenCL, MATLAB, Simulink, or other high-level synthesis (HLS) language.

In general, the behavioral design specification 502 may include untimed or partially timed functional code (i.e., the application code does not describe cycle-by-cycle hardware behavior), whereas the RTL description 506 may include a fully timed design description that details the cycle-by-cycle behavior of the circuit at the register transfer level.

Design specification 502 or RTL description 506 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 502, the RTL description 506 (e.g., as a pragma or as an assertion), in a constraint file, or through user input (e.g., using the design and constraint entry tools 464 of FIG. 4), to name a few.

At step 504, behavioral synthesis (sometimes also referred to as algorithmic synthesis) may be performed to convert the behavioral description into an RTL description 506. Step 504 may be skipped if the design specification is already provided in form of an RTL description.

At step 518, behavioral simulation tools 472 may perform an RTL simulation of the RTL description, which may verify the functionality of the RTL description. If the functionality of the RTL description is incomplete or incorrect, the circuit designer can make changes to the HDL code (as an example). During RTL simulation 518, actual results obtained from simulating the behavior of the RTL description may be compared with expected results.

During step 508, logic synthesis operations may generate gate-level description 510 using logic synthesis and optimization tools 474 from FIG. 4. The output of logic synthesis 508 is a gate-level description 510 of the design.

During step 512, placement operations using for example placement tools 476 of FIG. 4 may place the different gates in gate-level description 510 in a preferred location on the targeted integrated circuit to meet given target criteria (e.g., minimize area and maximize routing efficiency or minimize path delay and maximize clock frequency or minimize overlap between logic elements, or any combination thereof). The output of placement 512 is a placed gate-level description 513, which satisfies the legal placement constraints of the underlying target device.

During step 515, routing operations using for example routing tools 476 of FIG. 4 may connect the gates from the placed gate-level description 513. Routing operations may attempt to meet given target criteria (e.g., minimize congestion, minimize path delay and maximize clock frequency, satisfy minimum delay requirements, or any combination thereof). The output of routing 515 is a routed gate-level description 516 sometimes be referred to as a device configuration bit stream or a device configuration image.

While placement and routing is being performed at steps 512 and 515, physical synthesis operations 517 may be concurrently performed to further modify and optimize the circuit design (e.g., using physical synthesis tools 476 of FIG. 4).

The RTL design flow of FIG. 5 often produces circuit designs with limited performance. This is because the ability for a particular logic cell to access high speed routing wires is largely a matter of luck when designing using the regular RTL flow since optimizations related to physical place and route operations generally lack symmetrical access to the routing network on an FPGA. For instance, if first-choice direct path wires are unavailable at a given location, the logic cell is forced to take a much slower and circuitous route to the intended destination. This is caused by resource contention over limited physical routing wires, which is a difficult computational problem to optimize.

In accordance with an embodiment, an additional underlay flow may be used to map circuit designs to an existing underlay. An "underlay" may be defined herein as a subset of routing wires or a routing pattern that naturally exists as part of the FPGA routing network architecture and that satisfy some predetermined speed criteria. The routing pattern(s) of an underlay naturally existing on the FPGA are therefore sometimes referred to as "artifacts" of the FPGA routing fabric. The routing wires of the underlay should typically include fast datapath connections suitable for use in arithmetic, networking, switching, or other function accelerator designs.

Figure 6:
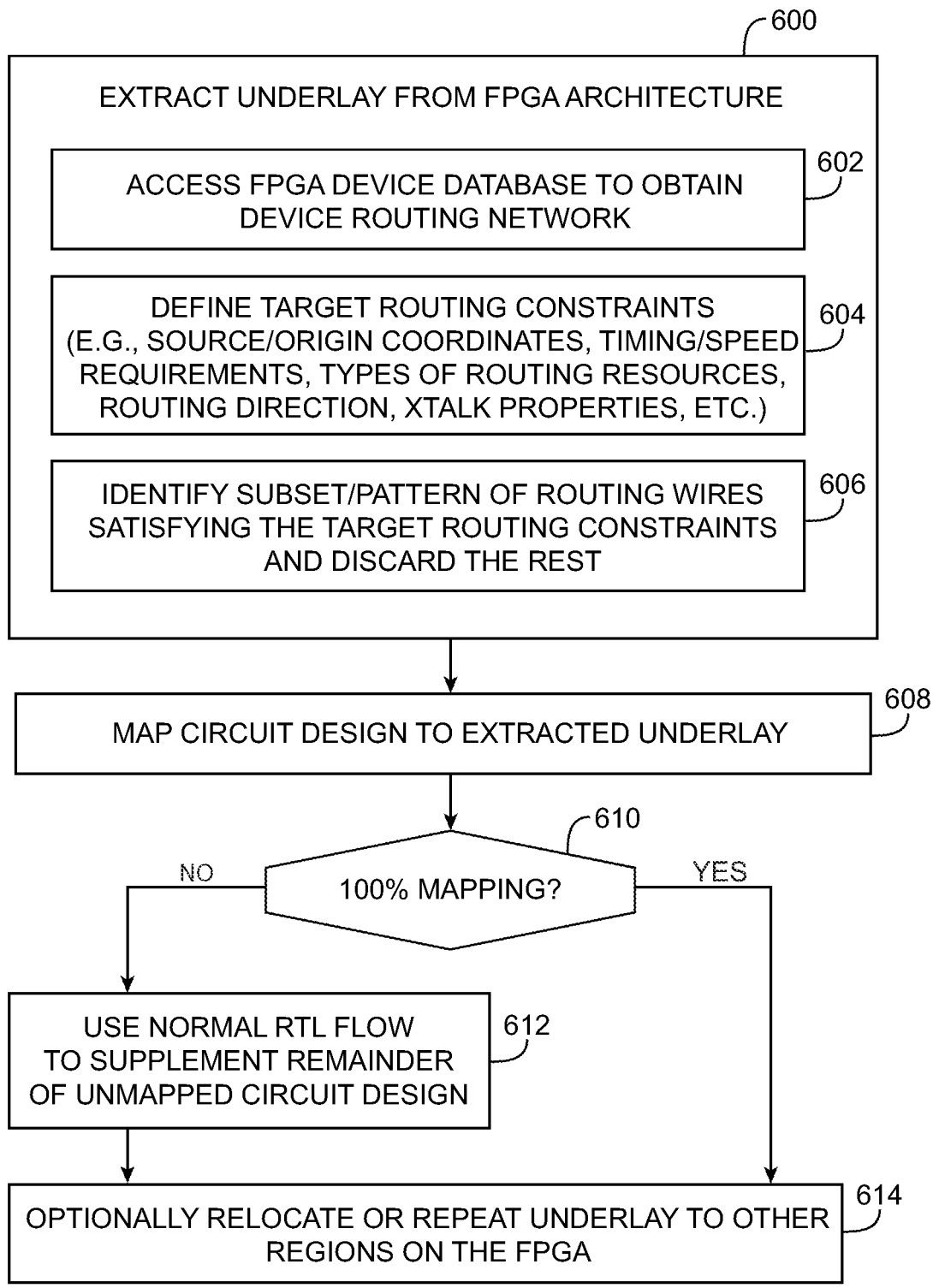
FIG. 6 is a flow chart of illustrative steps for identifying an underlay and mapping a circuit design to the underlay in accordance with an embodiment.

FIG. 6 is a flow chart of illustrative steps for extracting (parsing) an underlay and mapping a circuit design to the extracted underlay. The steps of FIG. 6 may be performed using circuit design tools 320 or 420 shown in FIGS. 3 and 4. At step 600, the design tools may be used to extract an underlay from the FPGA architecture. Step 600 may include a series of sub-steps 602, 604, and 606.

At step 602, the design tools may access an FPGA device database (see, e.g., database 330 of FIG. 3) to obtain a device routing network for the FPGA device. The device routing network lays out all of the routing connections that are available and existing on the FPGA.

At step 604, the design tools may receive user-defined target routing constraints. As examples, the routing constraints may specify source/origin coordinates for the signal routing paths, timing and speed requirements for the signal routing paths, types of routing resources that should be used (e.g., using only short global channels of a certain length, using only local interconnects circuits, using only direct-link sneak paths, etc.), routing direction(s), crosstalk properties, and other suitable signal routing criteria.

At step 606, the design tools may identify a subset/pattern of routing wires made up of adjacent (or near-adjacent) logic blocks within the device routing network that satisfy the target routing constraints defined at step 604. This identified subset of wires makes up the underlay, and the rest of the wireless should be discarded as not being part of the underlay.

This underlay extraction is effectively a heavily constrained logic router. Given certain constraints, it is possible for there to be no solution or only a very small number of solutions. As such, the design tools may use a recursive search with ranking heuristics (which may or may not be completely stable) rather than a conventional global search to identify the subset of routing wires. The recursive search is a more exhaustive and computation intensive but may be acceptable for such restricted domain. Out of necessity, the extraction tool may suppose an additional degree of freedom versus the conventional CAD flow. While the conventional router operates with fixed origin and destination terminals (i.e., a fixed circuit placement that needs to be wired together), the underlay router may accept a variety of destination terminals and then revise the requested logic resources to deliver a partial high speed solution for the desired function.

At step 608, a user's circuit design may be mapped to the extracted underlay (e.g., so that signals of the circuit design only use the routing paths defined by the extracted underlay). Ideally, the user circuit design or application can be mapped to the extracted underlay with 100% efficiency. This is, however, not always possible. If the user's design cannot be entirely mapped to the extracted underlay (as determined at step 610), the regular RTL flow of FIG. 5 may be used to implement the remainder of the unmapped circuit design at step 612 (e.g., additional place and route operations may be performed on the unmapped portions of the logic circuit).

At step 614, the extracted underlay may optionally be relocated or repeated to one or more other regions on the FPGA (e.g., the underlay may be applied to a local region or across the entire device). FPGAs generally have regular repeatable architecture blocks, so the underlay pattern can be repeatedly implemented across the device over ten times, several hundred times, or even thousands of times. As examples, the underlay may be mapped to a Clos network, an artificial intelligence (AI) network, an accelerator platform, or other suitable datapath designs. Mapping circuit designs to extracted high speed underlays in this way will greatly increase the performance of the custom logic design, often doubling the maximum operating frequency (Fmax) compared to prior implementations that uses only the regular RTL flow.

The underlay targeted design can coexist with the regular design flow. As an example, the underlay-mapped design might be an accelerator operating at a much higher clock rate than the rest of the logic circuit implemented using the regular flow.

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

Figure 7:
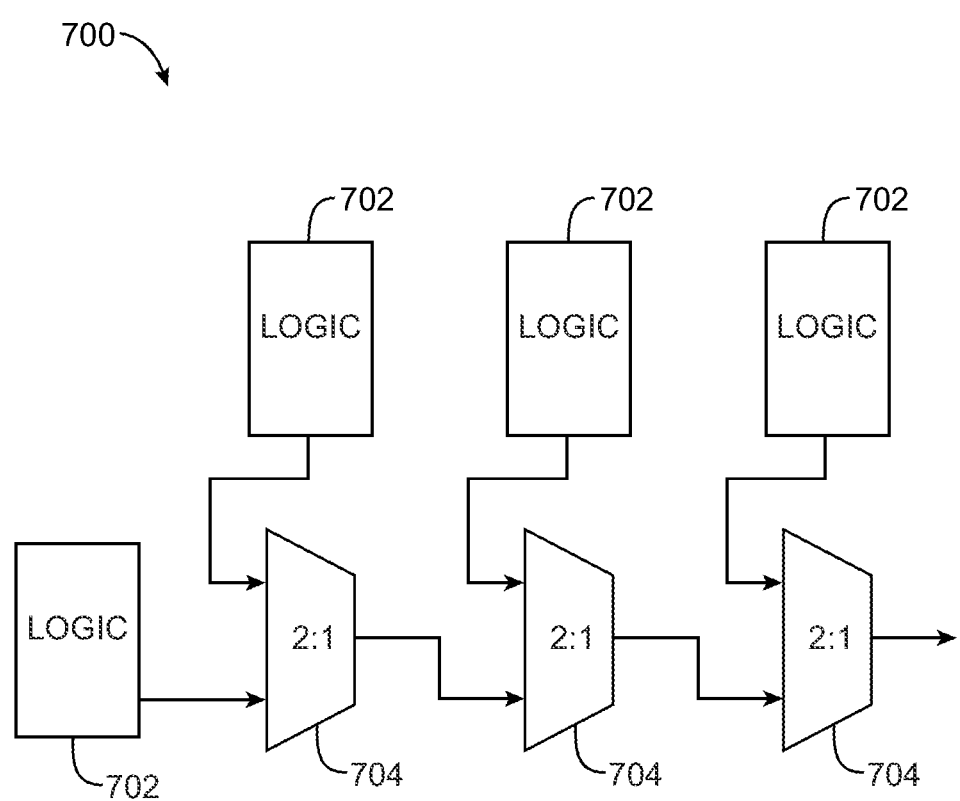
FIG. 7 is a diagram of an illustrative routing underlay composed of 2:1 multiplexers in accordance with an embodiment.

The underlay extraction methodology of FIG. 6 may be used to extract repeatable high-speed routing patterns such as routing underlay 700 of FIG. 7. As shown in FIG. 7, underlay 700 may include repeating 2:1 multiplexing circuits 704 connected in a chain. A first multiplexer 704 may have inputs configured to receive signals from two different logic blocks 702. Logic blocks 702 may represent logic blocks 202 of FIG. 2. A second multiplexer 704 may have a first input connected to the output of the first multiplexer 704 and a second input configured to receive signals from another logic block 702. A third multiplexer 704 may have a first input connected to the output of the second multiplexer 704 and a second input configured to receive signals from yet another logic block 702. This example in which underlay 700 includes three multiplexers 704 connected in series is merely illustrative. In general, underlay 700 may include any suitable number of repeatable multiplexing circuits (e.g., 2:1 multiplexers, 3:1 multiplexers, some combination of 2:1 and 3:1 multiplexers, etc.) interconnected to form high speed routes. There is no one fixed underlay for an FPGA. Different routing patterns may also be detected depending on the target routing density and target performance or if the constraints were relaxed.

Figure 8:
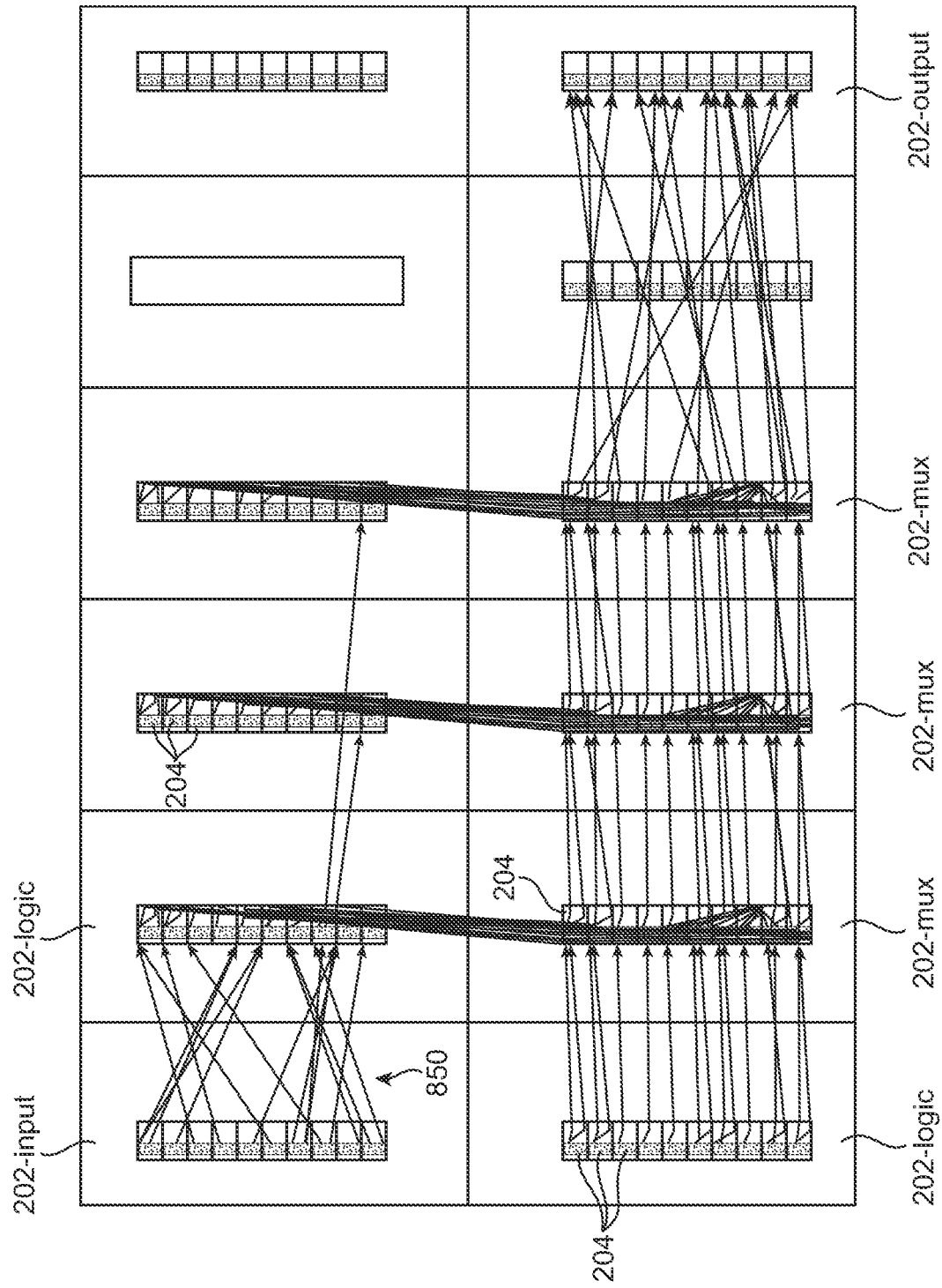
FIG. 8 is a diagram of an actual routing pattern using the underlay of FIG. 7 in accordance with an embodiment.

FIG. 8 is a diagram of an actual routing pattern using the underlay 700 of FIG. 7. As shown in FIG. 8, underlay 700 may include a plurality of adjacent (or near-adjacent) logic blocks, where each logic block 702 may be implemented using a LAB 202-logic, and where each of the 2:1 multiplexers 704 may be implemented using a LAB such as LAB 202-mux (sometimes referred to herein as a LAB-wide multiplexer). A LAB 202-input may include device input pins that feed signals to a corresponding LAB 202-logic. The third LAB-wide mux 202-mux may feed signals to a corresponding LAB 202-output, which may include device output pins.

FIG. 8 shows fast routing connections linking together the logic cells 204 between the different LABs (see, e.g., direct link paths 216 described in connection with FIG. 2). While most of these fast routes have a 1:1 correlation or pairing between logic cells of the same indices, some of the fast routes may be scrambled (as shown in portion 850). When the underlay wires are scrambled, one potential issue when mapping an arithmetic datapath to such routing underlay is that a carry chain might not be able to be mapped to such underlay. This is, however, the fastest underlay. There may be a slightly slower underlay that will have a 1:1 pairing for every LAB (i.e., signals will arrive in a bit ordering which is logically acceptable to the destination function).

The underlay need not be fully developed either. In one case, most of the connections will be mapped to the underlay (e.g., by constraining connections to known fast connections in the underlay), and logic cells where no fast connections are known for that underlay may be left to float, relying on the regular RTL flow to later find a connection for those floating logic cells. Because most of the connections in the underlay are constrained, the design tools should have an easier time finding a fast route for the unspecified connections as the degrees of placement/routing freedom for the overall circuit structure are greatly reduced.

The underlay is most efficient performance-wise when it is used with fast nets. As more and more logic is added around the underlay, the more the speed might drop. However, in contrast to the regular design flow, the extracted underlay will provide a local repeatable routing structure/framework that can be replicated across the device to optimize for speed and logic utilization depending on the user's target.

Figure 9A:
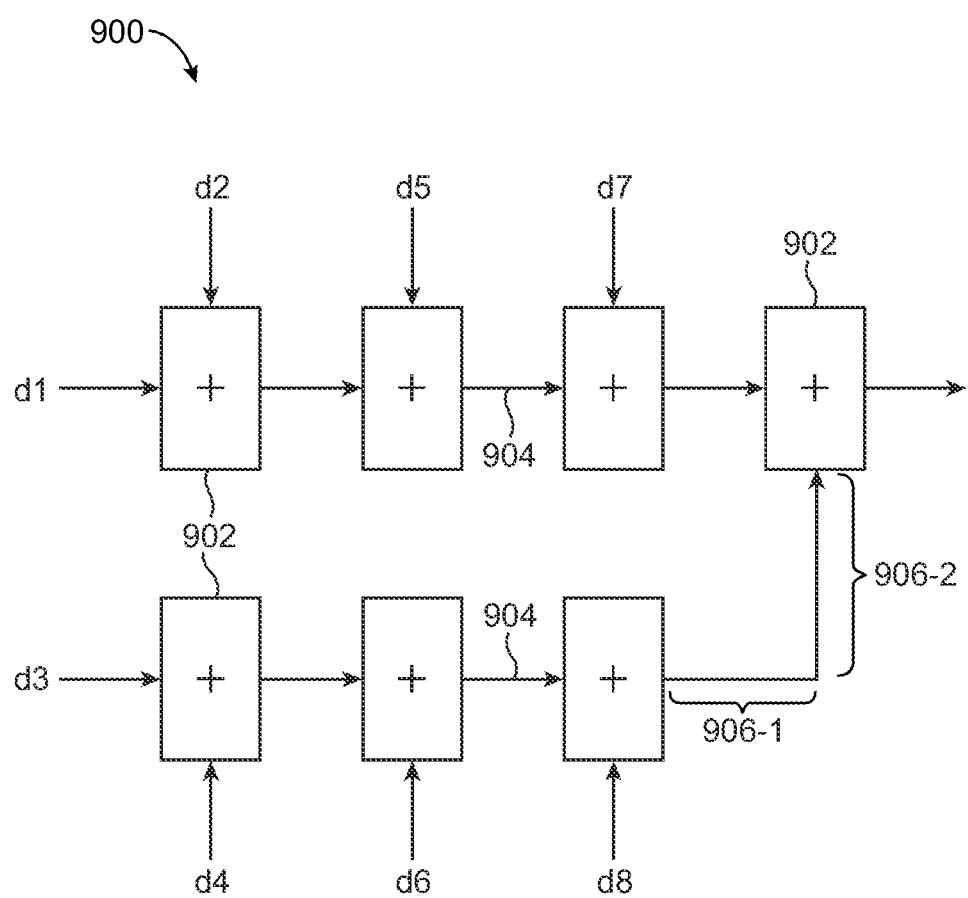
FIGS. 9A-9C are diagrams of illustrative routing underlays composed of adders in accordance with some embodiments.

Underlay 700 of FIG. 7 composed of repeating 2:1 multiplexers is merely illustrative and is not intended to limit the scope of the present embodiments. FIG. 9A shows another suitable underlay 900 composed of repeating adders configured to compute a sum of eight input words. As shown in FIG. 9A, underlay 900 may include repeatable adders 902 connected in a chain-like structure to sum together input words d1-d8, where each adder 902 combines two separate values. Each adder 902 may be implemented using a logic block (see, e.g., LAB 11 of FIG. 1 or logic block 202 of FIG. 2, or other suitable group of logic elements) and may therefore be referred to as a LAB-wise adder. In the example of FIG. 9A, most of the connections between adjacent adders 904 are short horizontal wires 904, but note that one of the connections is composed of one horizontal routing segment 906-1 and one vertical routing segment 906-2. The delay through segments 906-1 and 906-2 may be slower than the delay through a single horizontal wire 904.

Figure 9B:
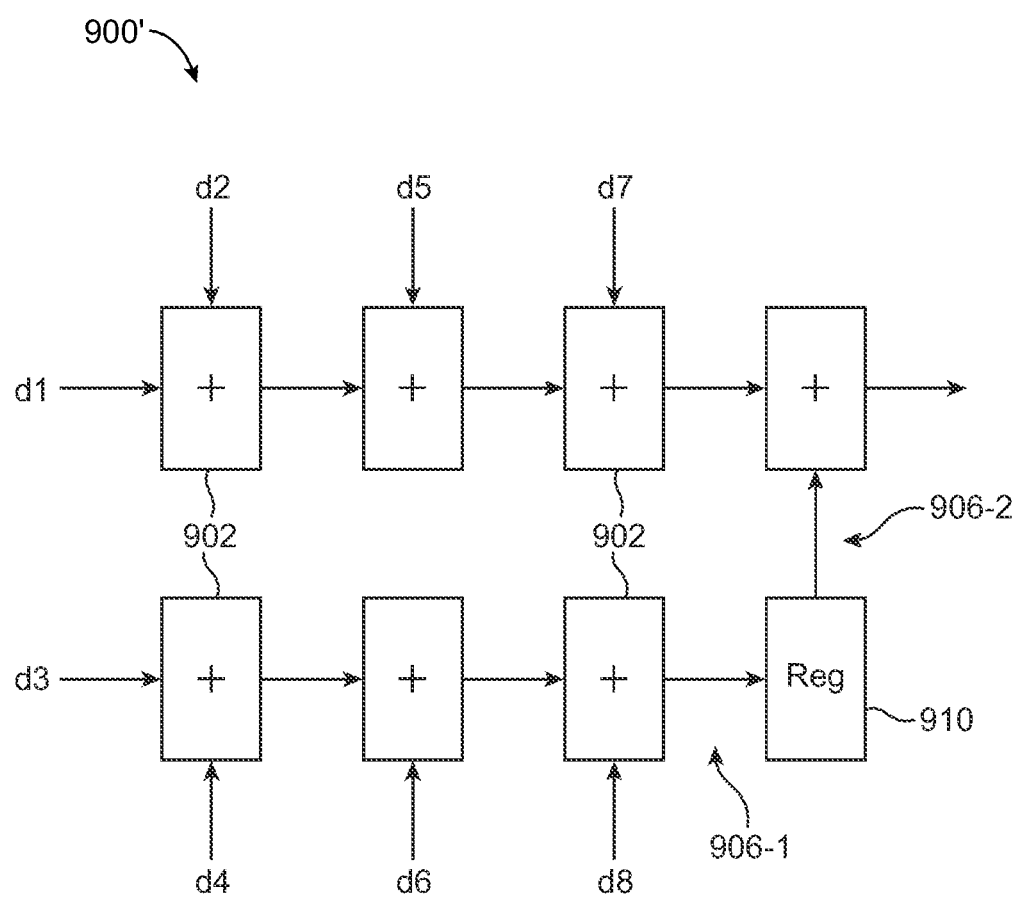

FIG. 9B shows another suitable underlay 900' that includes an additional register circuit 910 interposed between the horizontal routing segment 906-1 and the vertical routing segment 906-2. Registers 910 configured in this way may serve as a pipelining element for improving the throughput of the overall adder-based underlay 900'.

Figure 9C:
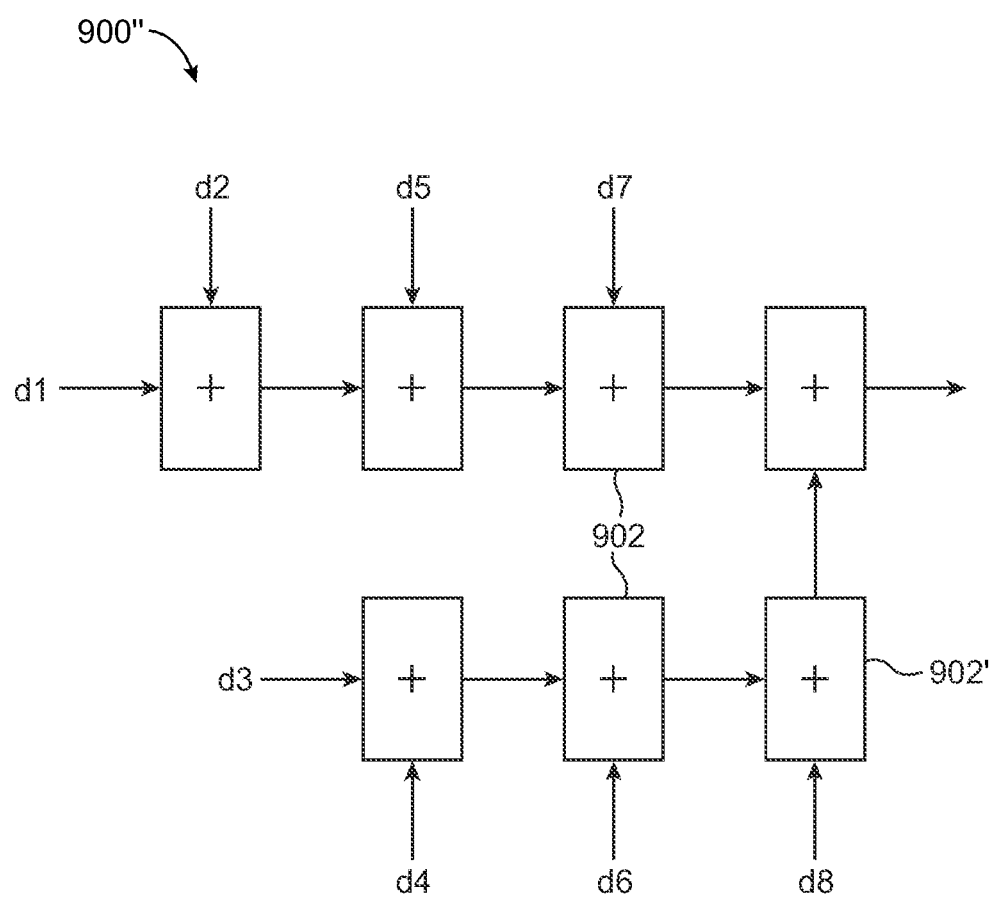

FIG. 9C shows yet another suitable underlay 900" that moves an adder such as adder 902' to the turning node. Configured in this way, all wires between adjacent adders 902 may be equally fast without sacrificing any latency that otherwise would have been introduced by a pipelining register.

Figure 10:
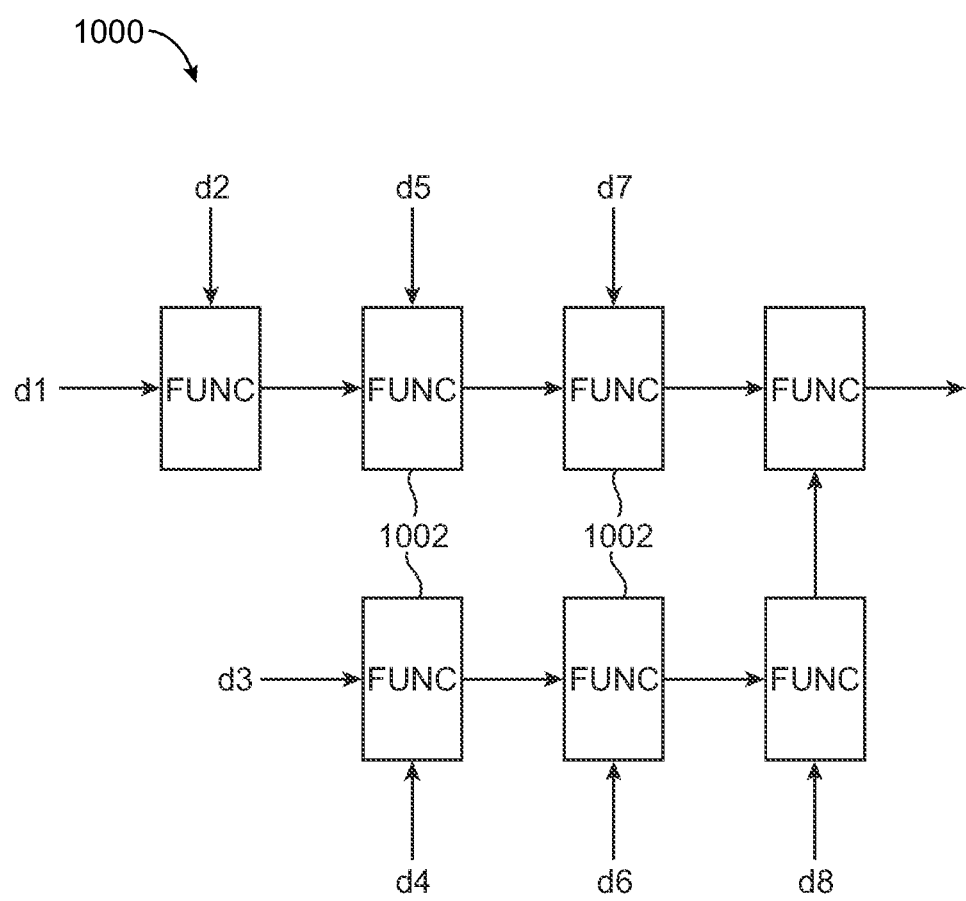
FIG. 10 is a diagram of an illustrative routing underlay composed of function blocks in accordance with an embodiment.

The example of FIGS. 7-8 in which the underlay is composed of 2:1 multiplexers and the examples of FIGS. 9A-9C in which the underlay is composed of adders are merely illustrative. FIG. 10 illustrates an underlay such as FPGA underlay 1000 formed from function blocks 1002 configured to compute some function of eight different input words d1-d8. Function blocks 1002 may be "soft" (programmable) logic blocks or "hard" non-configurable functional blocks (sometimes referred to as embedded/hardwired functional blocks). Each function block 1002 may be implemented using a logic block (see, e.g., LAB 11 of FIG. 1 or logic block 202 of FIG. 2, or other suitable group of logic elements) or a logic region. Each function block 1002 may be a multiplexer (e.g., a 2:1 multiplexer circuit), an adder, a logic gate (e.g., a logic AND gate, a logic NAND gate, a logic OR gate, a logic NOR gate, a logic XOR gate, a logic XNOR), and other suitable 2:1 functional operator that can be selected from a library of preformed elements. If desired, each function block 1002 within underlay 1000 may have more than two inputs. In general, underlay 1000 may include any number of function blocks 1002 used to combine more than eight input signals or less than eight input signals.

The preformed library elements may have different ingress and egress patterns, which help enable assembly of larger systems since data does not always simply flow from the source to the destination in one direction using a constant datapath width. FIGS. 11A-11D are diagrams of illustrative 2:1 datapath reduction operators with different ingress/egress patterns. These 2:1 datapath reduction operators may be a multiplexer (e.g., a 2:1 multiplexer circuit), an adder, a logic gate (e.g., a logic AND gate, a logic NAND gate, a logic OR gate, a logic NOR gate, a logic XOR gate, a logic XNOR), and other suitable 2:1 functional operator.

Figure 11:
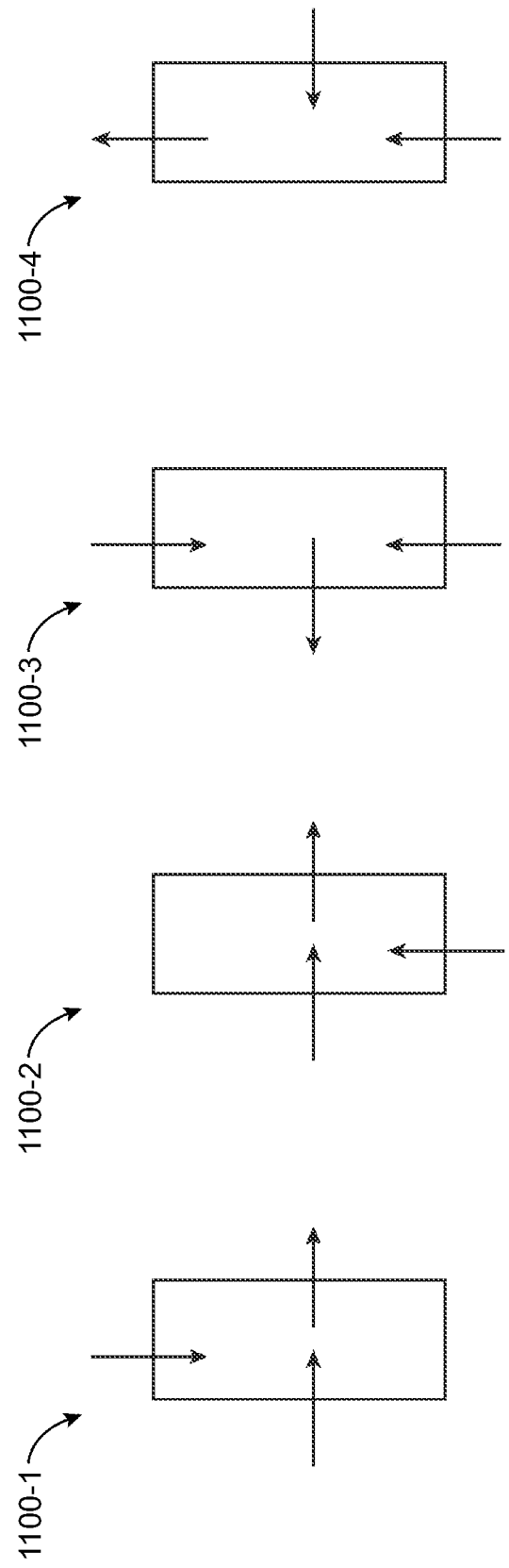
FIGS. 11A-11D are diagrams of illustrative 2:1 operators with different ingress/egress patterns in accordance with some embodiments.

As an example, FIG. 11A shows a first datapath reduction operator 1100-1 having first and second ingress ports from the west and north edges and an egress port at the east edge. As another example, FIG. 11B shows a second datapath reduction operator 1100-2 having first and second ingress ports from the west and south edges and an egress port at the east edge. As yet another example, FIG. 11C shows a third datapath reduction operator 1100-3 having first and second ingress ports from the north and south edges and an egress port at the west edge. As yet another example, FIG. 11D shows a fourth datapath reduction operator 1100-4 having first and second ingress ports from the south and east edges and an egress port at the north edge.

The examples of FIGS. 11A-11D are merely illustrative. In general, a 2:1 function operator may have ingress ports from any two edges and an output port at some other edge. Each of these datapath reduction operators may be implemented using a logic block (see, e.g., LAB 11 of FIG. 1 or logic block 202 of FIG. 2, or other suitable group of logic elements) or a logic region. The input and output ports of these datapath reduction operators may be connected to channels of any suitable length (e.g., short global channels R_short/C_short or long global channels R_long/C_long of the type described in connection with FIG. 2).

Figure 12:
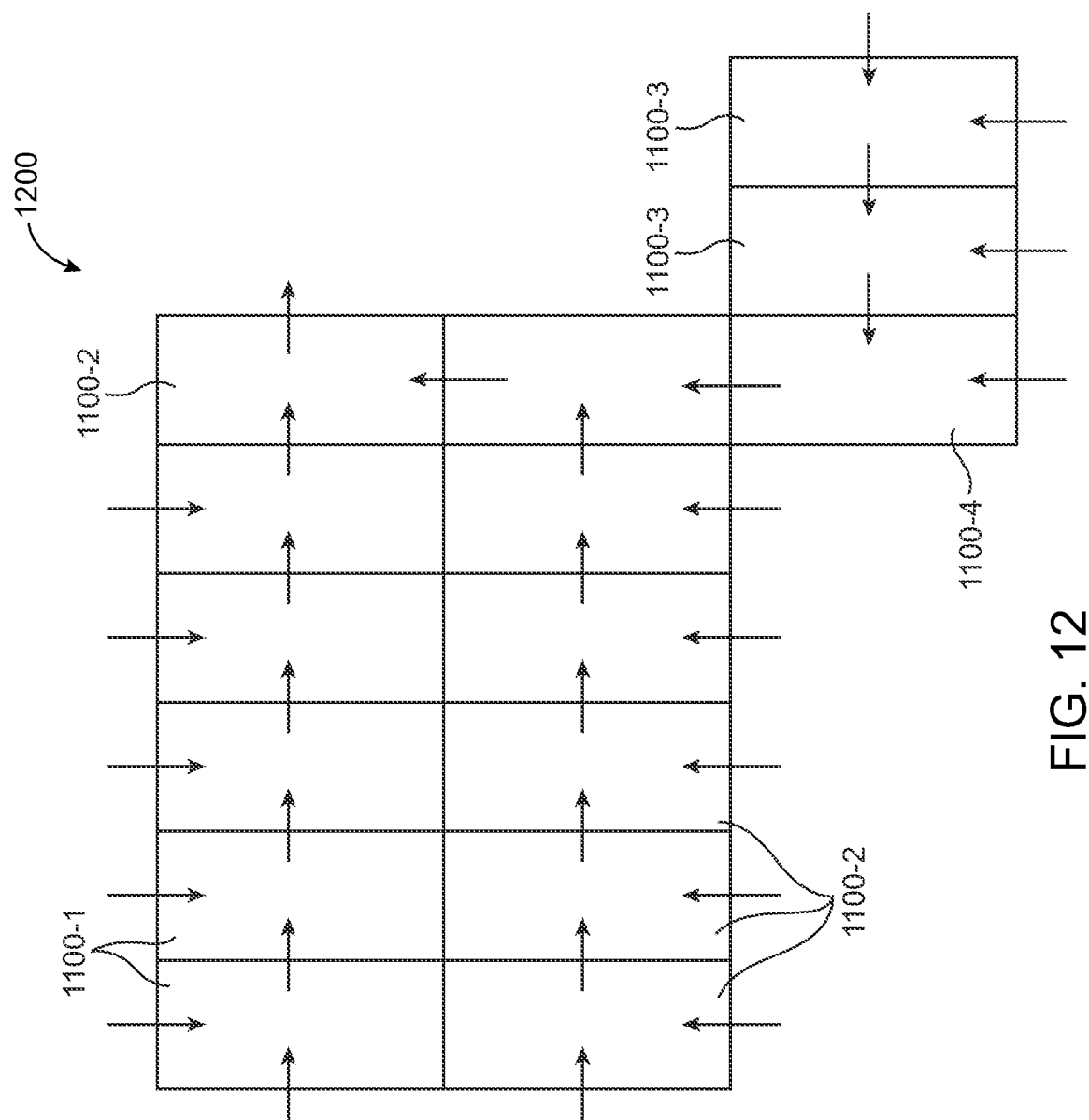
FIG. 12 is a diagram of an illustrative routing underlay formed using a plurality of 2:1 operators with different ingress/egress patterns in accordance with an embodiment.

Although somewhat restrictive in the freeform construction sense, a large number of interesting circuits can be expressed or built using adjacent (or near-adjacent) 2:1 datapath reduction operators. FIG. 12 is a diagram of an illustrative N:1 multiplexer that can be constructed from a plurality of 2:1 multiplexing operators with different ingress/egress patterns. As shown in FIG. 12, an underlay 1200 representing a 16:1 multiplexer may be composed using the different types of adjacent datapath reduction operators of FIGS. 11A-11D.

In general, any digital circuit can be expressed as a composition of 2:1 logic NAND gates, so all circuits can be assembled using 2:1 reduction nodes in this manner. The additional requirement of adjacency (or near-adjacency) in a two-dimensional layout is constraining but not insurmountable. Underlays formed from these 2:1 datapath reduction operators are known to be extremely fast a priori, so any larger circuit mapped to such underlays will be able to operate at very high speeds. This is in sharp contrast to prior methodologies that perform full place and route, which is often limited by the speed of the least successful wiring connection.

The embodiments thus far have been described with respect to programmable integrated circuits. Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IC circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

EXAMPLES

The following examples pertain to further embodiments.

Example 1 is a method of using design tools to implement a logic circuit on a programmable device, comprising: extracting an underlay from a routing network on the programmable device, wherein the extracted underlay comprises a subset of routing wires in the routing network satisfying target routing constraints; and mapping the logic circuit to the extracted underlay. Signals in the logic circuit use only the routing paths defined in the extracted underlay.

Example 2 is the method of example 1, wherein extracting the underlay optionally comprises accessing a database to obtain information on the routing network.

Example 3 is the method of example 2, wherein extracting the underlay optionally further comprises receiving the target routing constraints, and wherein the target routing constraints comprise constraints selected from the group consisting of: source coordinates, timing requirements, speed requirements, types of routing resources, routing direction, and crosstalk properties.

Example 4 is the method of any one of examples 1-3, optionally further comprising determining whether the logic circuit is entirely mapped to the extracted underlay.

Example 5 is the method of example 4, optionally further comprising performing additional place and route operations to unmapped portions of the logic circuit in response to determining that the logic circuit cannot be entirely mapped to the extracted underlay.

Example 6 is the method of any one of examples 1-5, optionally further comprising using the extracted underlay on at least one other region on the programmable device.

Example 7 is the method of any one of examples 1-6, wherein the extracted underlay optionally comprises a plurality of adjacent programmable logic blocks.

Example 8 is the method of any one of examples 1-7, wherein the extracted underlay optionally comprises a plurality of 2:1 datapath reduction operators.

Example 9 is the method of example 8, wherein the plurality of 2:1 datapath reduction operators optionally comprises a plurality of 2:1 multiplexers.

Example 10 is the method of example 8, wherein the plurality of 2:1 datapath reduction operators optionally comprises a plurality of adders.

Example 11 is the method of example 8, wherein the plurality of 2:1 datapath reduction operators optionally comprises a plurality of logic gates.

Example 12 is the method of example 8, wherein the plurality of 2:1 datapath reduction operators optionally have different ingress and egress patterns.

Example 13 is an integrated circuit, comprising: a programmable routing network; and a logic circuit implemented using an underlay extracted from the programmable routing network, wherein the underlay comprises a wiring pattern within the programmable routing network satisfying target routing constraints.

Example 14 is the integrated circuit of example 13, wherein the underlay optionally comprises a plurality of programmable logic blocks.

Example 15 is the integrated circuit of example 13, wherein the underlay optionally comprises a plurality of adjacent programmable logic blocks.

Example 16 is the integrated circuit of any one of examples 14-15, wherein at least one of the plurality of programmable logic blocks in the underlay is optionally used to implement a 2:1 datapath reduction operator.

Example 17 is the integrated circuit of example 16, wherein the 2:1 datapath reduction operator optionally comprises a 2:1 multiplexer.

Example 18 is the integrated circuit of example 16, wherein the 2:1 datapath reduction operator optionally comprises an adder.

Example 19 is the integrated circuit of example 16, wherein the 2:1 datapath reduction operator optionally comprises a logic gate.

Example 20 is the integrated circuit of any one of examples 13-19, wherein the target routing constraints optionally comprise a timing constraint.

Example 21 is a non-transitory computer-readable storage medium comprising instructions to: extract a subset of routing paths in a programmable interconnect fabric, where the extracted subset of routing paths satisfies predetermined performance criteria; and map an application to the extracted subset of routing paths.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. A method of using design tools to implement a logic circuit on a programmable device, comprising:
    extracting an underlay from a routing network on the programmable device, wherein the extracted underlay comprises a subset of routing wires in the routing network satisfying target routing constraints; and
    mapping a first portion of the logic circuit to the extracted underlay and a second portion of the logic circuit to the routing network at least partially outside of the underlay, wherein the first portion corresponds to a first operation type and the second portion corresponds to a second operation type.

2. The method of claim 1, wherein extracting the underlay comprises:
    accessing a database to obtain information on the routing network.

3. The method of claim 2, wherein extracting the underlay further comprises:
    receiving the target routing constraints, wherein the target routing constraints comprise constraints selected from the group consisting of: source coordinates, timing requirements, speed requirements, types of routing resources, routing direction, and crosstalk properties.

4. The method of claim 1, further comprising:
    using the extracted underlay on at least one other region on the programmable device.

5. The method of claim 1, wherein the extracted underlay comprises a plurality of adjacent programmable logic blocks.

6. The method of claim 1, wherein the extracted underlay comprises a plurality of 2:1 datapath reduction operators.

7. The method of claim 6, wherein the plurality of 2:1 datapath reduction operators comprises a plurality of 2:1 multiplexers.

8. The method of claim 6, wherein the plurality of 2:1 datapath reduction operators comprises a plurality of adders.

9. The method of claim 6, wherein the plurality of 2:1 datapath reduction operators comprises a plurality of logic gates.

10. The method of claim 6, wherein the plurality of 2:1 datapath reduction operators have different ingress and egress patterns.

11. The method of claim 1, wherein the first operation type comprises operations of an accelerator, and the second operation type comprises operations not of the accelerator.

12. The method of claim 1, wherein the first operation type uses a higher clock rate than the second operation type.

13. An integrated circuit, comprising:
a programmable routing network; and
a logic circuit comprising:
a first portion implementing a first operation type using an underlay extracted from the programmable routing network; and
a second portion implementing a second operation type at least partially outside of the extracted underlay, wherein the extracted underlay comprises a wiring pattern within the programmable routing network satisfying target routing constraints.

14. The integrated circuit of claim 13, wherein the extracted underlay comprises a plurality of programmable logic blocks.

15. The integrated circuit of claim 14, wherein at least one of the plurality of programmable logic blocks in the extracted underlay is used to implement a 2:1 datapath reduction operator.

16. The integrated circuit of claim 15, wherein the 2:1 datapath reduction operator comprises a 2:1 multiplexer.

17. The integrated circuit of claim 15, wherein the 2:1 datapath reduction operator comprises an adder.

18. The integrated circuit of claim 15, wherein the 2:1 datapath reduction operator comprises a logic gate.

19. The integrated circuit of claim 13, wherein the extracted underlay comprises a plurality of adjacent programmable logic blocks.

20. The integrated circuit of claim 13, wherein the target routing constraints comprise a timing constraint.

21. A non-transitory computer-readable storage medium comprising instructions to:
extract a subset of routing paths in a programmable interconnect fabric, where the extracted subset of routing paths satisfies predetermined performance criteria; and
map a first portion of a logic circuit to the extracted subset of routing paths and a second portion of the logic circuit to the routing paths at least partially outside of the subset, wherein the first portion corresponds to a first operation type and the second portion corresponds to a second operation type.

* * * * *